United States Patent
Nolan et al.

(10) Patent No.: US 7,966,312 B2
(45) Date of Patent: Jun. 21, 2011

(54) UPDATABLE RESULT SET FOR MULTIPLE JOINED TABLES

(75) Inventors: Thomas C. Nolan, San Diego, CA (US); Jack Yuan, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 519 days.

(21) Appl. No.: 11/869,772

(22) Filed: Oct. 10, 2007

(65) Prior Publication Data
US 2009/0100002 A1    Apr. 16, 2009

(51) Int. Cl.
*G06F 17/30* (2006.01)

(52) U.S. Cl. .................. 707/713; 707/715; 707/999.004; 707/999.005

(58) Field of Classification Search .............. 707/713, 707/715, 999.003, 999.006, 999.01
See application file for complete search history.

(56) References Cited

U.S. PATENT DOCUMENTS

| | | | |
|---|---|---|---|
| 6,496,819 B1 * | 12/2002 | Bello et al. ........................ 1/1 |
| 6,553,371 B2 | 4/2003 | Gutierrez-Rivas et al. | |
| 6,615,206 B1 | 9/2003 | Jakobsson et al. | |
| 7,254,574 B2 * | 8/2007 | Cunningham et al. ........ 707/714 |
| 2005/0125387 A1 * | 6/2005 | Fish et al. ........................ 707/3 |
| 2006/0218128 A1 | 9/2006 | Muras | |
| 2007/0073759 A1 | 3/2007 | El-Sabbagh | |

* cited by examiner

*Primary Examiner* — Apu M Mofiz
*Assistant Examiner* — Monica M Pyo
(74) *Attorney, Agent, or Firm* — Schwegman, Lundberg & Woessner, P.A.

(57) ABSTRACT

A technique for providing an updatable result set from multiple joined tables derived from a plurality of databases includes testing for at least one unique index from each of the multiple joined tables. A technique for providing an updatable result set from multiple joined tables that may include null values for outer-joined tables includes testing for a connection to the unique indexes and the null values.

13 Claims, 3 Drawing Sheets

FIG. 3
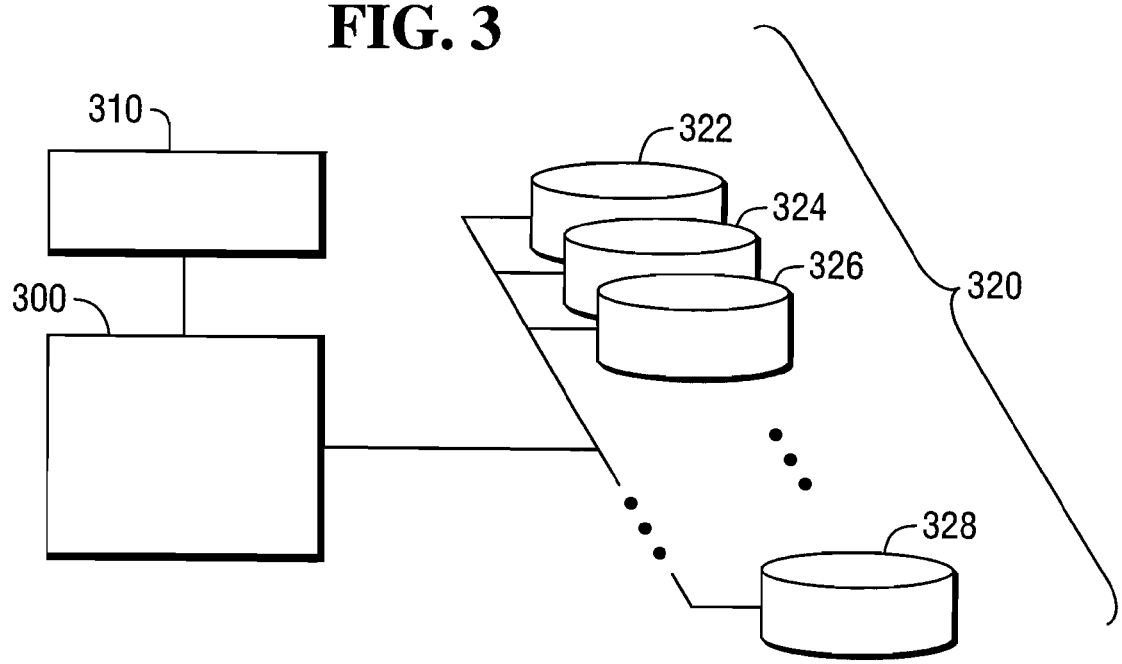
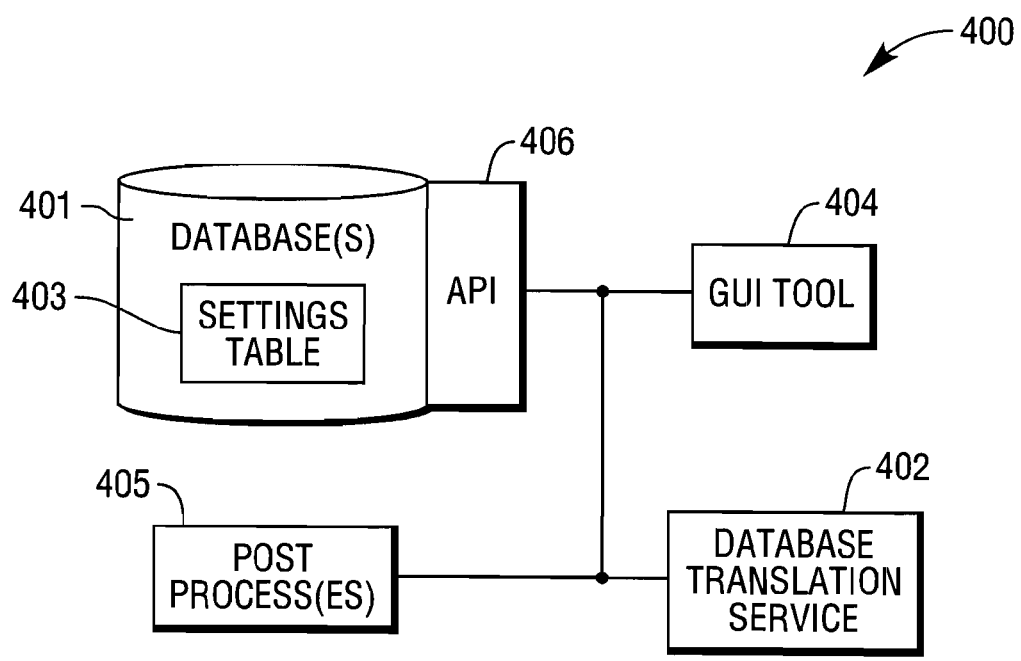
FIG. 4

UPDATABLE RESULT SET FOR MULTIPLE JOINED TABLES

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright © 2007, NCR Corp. of Dayton, Ohio—All Rights Reserved.

TECHNICAL FIELD

The disclosure relates generally to data bases and complex database queries.

BACKGROUND

Many enterprise applications utilize queries that fetch data from different databases. As tables or parts thereof are accessed from the different databases, the tables may have different dimensions or data formats. A challenge therefore exists to provide updatable result sets for data fetched from multiple tables. Updatable result sets have been limited conventionally to a single table query.

BRIEF DESCRIPTION OF THE DRAWINGS

FIG. 3 is a schematic of a system for returning an updatable result set from joined tables according to an example embodiment.

FIG. 4 is a diagram of a system for returning an updatable result set from joined tables according to an example embodiment.

DETAILED DESCRIPTION

Figure 1:
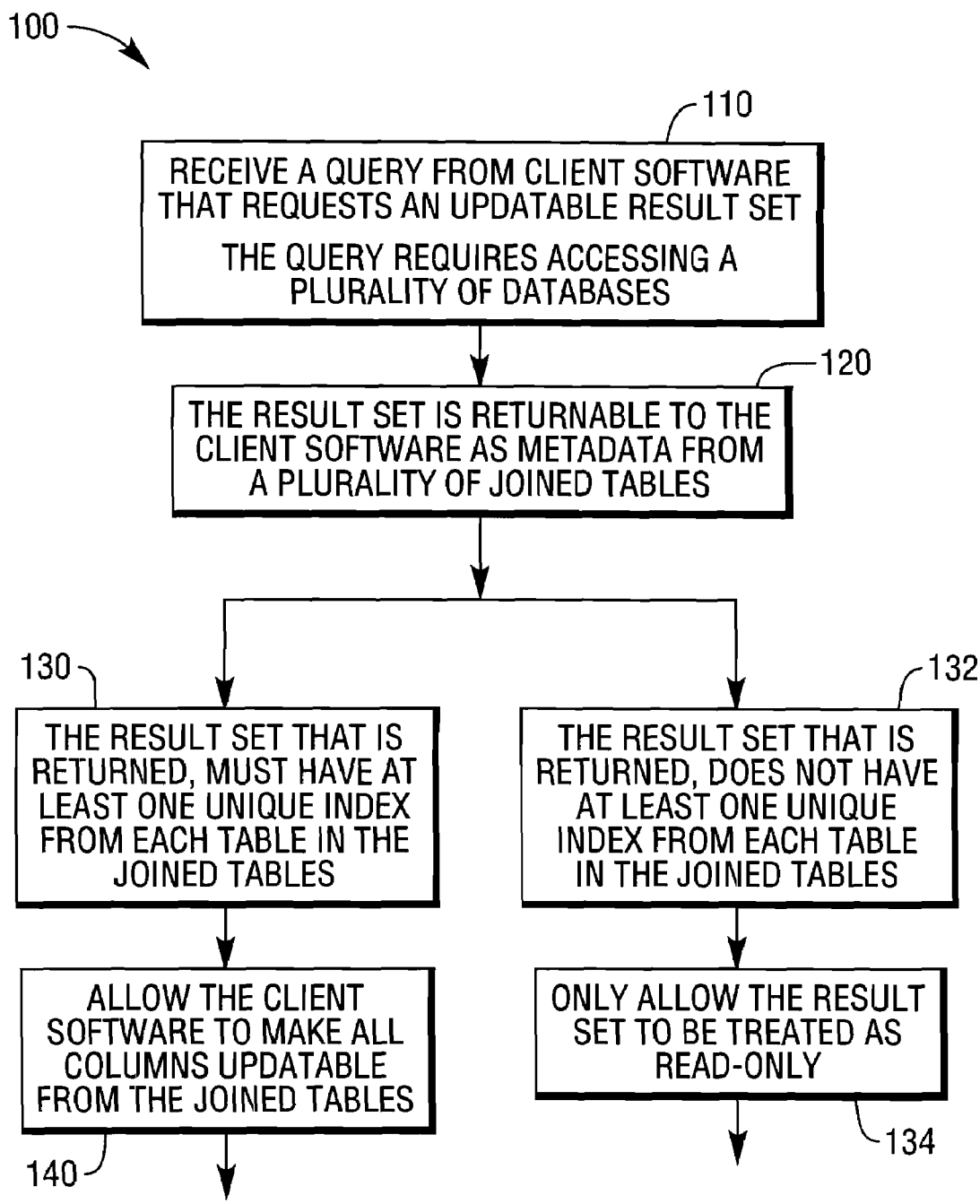
FIG. 1 is a diagram of a method flow for returning an updatable result set from joined tables that came from a query that accessed a plurality of databases according to an example embodiment.

This disclosure relates to providing updatable result sets for data that has been fetched from multiple joined tables as a result of a query. The multiple joined tables may be derived from a single database, or may be derived from different databases. A client makes a query by use of client software, and multiple databases are accessed to accommodate the query. Data tables are accessed within the databases, and metadata is provided back to the client that has joined the accessed tables. Further, information in the metadata is provided regarding the uniqueness of data, or the lack thereof, for any data in the multiple joined tables. Metadata is generated for the columns, such as the column name, and for the data type in the column such as a number or a string.

For a result set to be updatable, the metadata that is provided from the database to the client software must indicates the particular column or columns in the result set that have unique data sets and therefore unique indexes in the tables that are being accessed. Where, however, the metadata that is provided back to the client software does not have unique indexes from each of the multiple joined tables, the result set will not be updatable.

The term "database" as used herein refers to a collection of databases that may be integrated with one another as a data warehouse. According to an embodiment, the database is a Teradata® warehouse product or service distributed by NCR Corporation of Dayton, Ohio.

The term "metadata" refers to a type of data that is derived from other tables or databases and that may be consumed and manipulated by an Application Programming Interface (API) associated with a database. "Persistent metadata" is data that is stored and retained with the database. Both actual data and metadata can be accessed and manipulated using operations or modules associated with the database of an application programming interface (API). According to an embodiment, the API used herein at least partially supports or includes structured query language (SQL). Other user-defined operations and customizations may be included in the API in any programming language, such as but not limited to C, C++, Perl, Java, etc.

In some embodiments, database access may use a variety of XML related applications to assist in joining tables, such as an Extensible Markup Language Style Sheet (XSL), and XSL Transform (XSLT) application, an XML parser, and/or an Extensible Markup Language Schema Definition (XSD).

Once a database table is made available within a system embodiment or within client software, various operations may be carried out for a user. These operations can include, but are not limited to, querying the database tables for specific information; deleting selective portions of the database tables; inserting additional information into selective fields of the database tables; modifying selective portions of the database tables, extracting information from the tables and using it as a search query against different database tables; and/or merging or joining selective portions of an entire database table with other database tables.

In an embodiment, post processing can occur with the result set returned from a query. The post processing can be independently achieved such as with subsequent and independent actions of end users or automated services. In an embodiment, the result set may be post-processed and may be configured or directed to call or initiate the post processing via a third-party application or service. One or more of these post processing activities can occur, such that by doing one technique the other techniques are not precluded from also occurring. For example, in order to obtain an updatable result set as a result of a query, some post processing may be done by the services of a third-party application to do other post processing, and an end user may elect to do even more post processing.

FIG. 1 is a diagram 100 of a method flow according to an example embodiment. The method flow includes returning an updatable result set from joined tables as a result of receiving a query. The query results in accessing a plurality of databases. The method flow is implemented in a machine-accessible and readable medium and is operational over a network according to an embodiment.

In an example depicted at 110, after a client fashions a query, the query is received from the client software and an updatable result set is requested in the query. At 120, the result set is returned to the client software, where the result set is from multiple joined tables taken from the plurality of databases.

At 130, the result set that is returned has a condition that indicates it has at least one unique index from each table in the multiple joined tables. In other words, each table within each accessed database has unique data in one column, or in a combination of columns. The client software determines on a row-by-row basis whether the updatable result set conditions are satisfied. Metadata indicates to the client software which column or columns in a given joined table has unique data. Further if this condition is met, the metadata indicates to the client software that a unique index exists for the column or columns from the given joined table.

At 140, the client software is allowed to make all columns updatable from the data in the multiple joined tables. In an embodiment, the client software is allowed to make all columns updatable in each entire table in the respective databases.

At 132, the method has branched because the result set that is returned has not met the condition that a unique index resides in each of the multiple joined tables.

At 134, the client software is not allowed to make all columns updatable from the data in the joined tables; rather, a read-only memory (ROM) result set is returned.

In an example as part of receiving a query from client software, a first database is accessed with, e.g., a Table A that has 10 columns that are returned in metadata, and a second database is also accessed with, e.g., a Table B that in this example also has 10 columns that are returned in the metadata. The query also includes a request to return an updatable result set. The tables are joined as a result of the query. In this example, each table has unique data in one column each. The metadata indicates to the client software which column in Table A has unique data and therefore a unique index. The metadata also indicates to the client software which column in Table B has unique data. With that information being logged in the client software, the result set can be updatable according to an embodiment. In an embodiment, the client software is allowed to update the result set. In an embodiment, the client software is able to update the data in each table in the multiple joined tables and not just in the columns that comprise the unique indexes.

A given query returns all the columns from both tables, and the metadata is provided for 20 columns, and at least two of the columns, one from each table, is indicated as being a unique index for each of Table A and Table B. Consequently, there are 20 columns in the join and all column values are updatable for both tables, each in their different databases.

In an example, unique data can only be found in, e.g., a given Table A of a database, by looking into three columns of Table A. The index therefore is unique by describing the locations of the data within columns that result in unique data within that portion of the first database. The accessed first database therefore returns the unique index for Table A as metadata. A second database is also accessed with, e.g., a Table B that in this example also has any number of columns that are returned in the metadata. In this example, unique data is also identified in Table B, such that when the client software receives a reply from the two databases as multiple-joined tables metadata, each table index indicates unique data. Again the tables are joined, and because each index for the multiple-joined joined tables indicates unique indexes, the result set can be updatable.

In an embodiment, an "inner join" is carried out as opposed to an "outer join". An inner join is less complex than the outer join because only matched rows are selected from the inner-joined tables. In an embodiment, the 10-column Table A, 10-column Table B example set forth above is an inner-join example.

Figure 2:
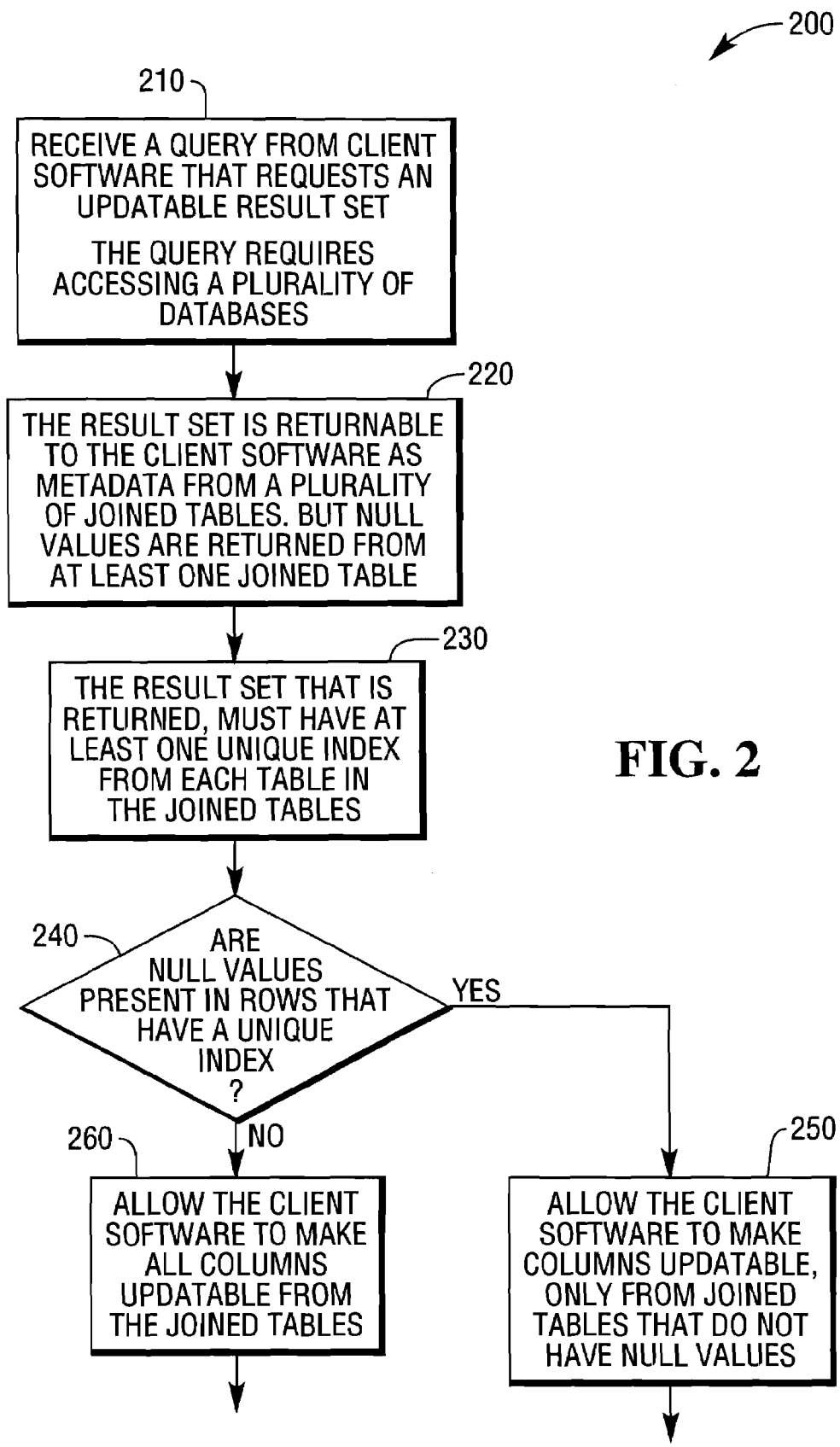
FIG. 2 is a diagram of a method flow for returning an updatable result set from joined tables that include null values that have been padded in the table according to an example embodiment.

FIG. 2 is a diagram 200 of a method flow according to an example embodiment. The method flow includes returning an updatable result set from joined tables as a result of receiving a query, but at least one of the joined tables includes null values that have been padded into at least one of the tables. The query also invokes the accessing of a plurality of databases. The method flow is implemented in a machine-accessible and readable medium and is operational over a network according to an embodiment.

At 210, after a client fashions a query, the query is received from the client software and an updatable result set is requested as part of the query. At 220, the result set is returnable to the client software and the result set is from multiple joined tables taken from the plurality of databases, but at least one of the joined tables includes null values.

At 220, the method includes a test for unique indexes that must be returned in each of the joined tables. Again, some null values are returned in the result set.

At 230, the method includes a test whether the updatable result set conditions are satisfied. If the updatable result set conditions are satisfied, the method proceeds to 240. If the updatable result set conditions are not satisfied, the method only allows the result set to be "read only".

At 240, although the initial updatable result set conditions are satisfied, meaning each of the joined tables has unique indexes, the method includes a test whether any null values are included in the columns that are required to allow the unique indexes.

At 240, if null values are present, for example, in a two-table join, e.g., a Table A has null values tied to a first unique index, but e.g. a Table B has no null values tied to a subsequent unique index, then the result set will not allow the client software to update any columns from Table A, and the method proceeds to 250.

Again at 240, if no null values are present, for example, in a two-table join, then the result set will allow the client software to update all columns in the two-table join. Consequently, the method proceeds to 260.

At 250 in an embodiment, the result set will allow the client software to update any columns from Table B because no null values are found in columns tied to the unique index for Table B.

In an embodiment, an outer join is carried out as a result of receiving the query from client software. As a result of the query, at least one of the tables, e.g., a Table D that is returned as part of the result set, must have null values placed in columns that are manufactured to match, e.g., a Table C. The result set that is returned as metadata is then subjected to the conditions regarding unique indexes required from each joined table. Further, the information made accessible to the client software, is that no row is located in the Table D that corresponds to that same row in the result set. In this example, the client software will not be permitted to update any of the columns on the rows where null values exist. Consequently, although unique indexes are possible for a result set with null values located therein, the outer-joined result set will not be allowed to be updatable by the client software.

In an outer-join embodiment, there is no index in the result set that has both unique values and null values. Consequently, all columns from the joined tables can be updated by the client software in the result set.

In an outer-join embodiment, there is one index from one of the joined tables, e.g., a Table E, in the result set that has unique values and no null values, but the index from another of the joined tables, e.g., a Table F, in the result set is also unique but has null values. Consequently, columns from Table E and not from Table F can be updated by the client software in the result set.

In an outer-join embodiment, there is one index from one of the joined tables, e.g., a Table G, in the result set that has unique values and no null values, but no index from another of the joined tables, e.g., a Table H, in the result set has unique values. Consequently, only columns from Table G and not from Table H can be updated by the client software in the result set.

FIG. 3 is a schematic depiction of a system 300 embodiment that accommodates client software 310 and a database warehouse 320 or the like to facilitate an updatable result set according to an embodiment. The method and systems are implemented in a machine or in computer readable and accessible media. The method and systems are accessible from a machine or a computer. The database warehouse 320 is illustrated with a first database 322, and a subsequent database 328. Although the database warehouse 320 is depicted as a unit, it may be a plurality of database warehouses.

A method is illustrated for providing an updatable result set for data fetched from multiple joined tables. A query and a request for an updatable result set is received from client software 310. A plurality of databases 320 is accessed. In an embodiment, a first table in a first database 322 is accessed, and a subsequent table in a subsequent database 328 is accessed. The query has requested the access to the first database 322 and the subsequent database 328, and the query requests an updatable result set.

As a result of the query and the request, first metadata is generated from a table in the first database 322 and subsequent metadata is generated from a table in the subsequent database 328. In an embodiment, joining the first table and the second table is carried out in the system 300.

Next, it is observed within the system 300, that the first metadata indicates a unique index condition as a result of at least one column in the joined first table. In this embodiment, it is also observed that a unique index condition is also indicated in the subsequent metadata. Consequently, the result set is provided and the request is granted such that the client software is allowed to update the result set. If, however, when the first metadata from the first database 322 does not indicate a unique index condition, or when the subsequent metadata from the subsequent database 328 does not indicate a unique index condition then a non-updatable result set such as ROM is provided to the client software.

In an embodiment, the plurality of databases that are accessed as a result of the query and request includes the first database 322, the subsequent database 328, and a second database 324. Under these conditions, the request for an updatable result set must be subjected to the same conditions as when only two databases are accessed. Further, FIG. 3 illustrates a third database 326, and an ellipsis that represents more than three databases, until the subsequent database 328.

FIG. 4 is a diagram of a system 400 for providing an updatable result set for multiple joined tables, according to an example embodiment. The system 400 for providing an updatable result set for multiple joined tables is implemented in a machine-accessible and readable medium and is operational over a network. In an embodiment, the network is one of wired, wireless, or a combination of wired and wireless. In an embodiment, portions of the system 400 implements the methods 100 and 200 depicted in of the FIGS. 1 and 2, respectively, as well as the system 400 may be described with a schematic 300 as illustrate in FIG. 3, although the various databases need not be in a single database warehouse.

The system 400 for providing an updatable result set for multiple joined tables includes a database 401 that represents a plurality of databases as set forth in this disclosure. The system 400 also provides a database translation service 402. In some embodiments, the system 400 for providing an updatable result set for multiple joined tables may also include a settings table 403, a graphical user interface (GUI) tool 404, one or more post processes 405, and/or an API 406. Each of these and their interactions with one another will now be discussed in turn.

In an embodiment, the database 401 resides in a machine-accessible medium or multiple media and can be accessed via other instructions that process on a machine. According to an embodiment, the database 401 is the Teradata® product distributed by NCR Corporation of Dayton, Ohio.

The database translation service 402 also resides in a machine-accessible media and is operable to be executed in a microprocessor. The database translation service 402, when processed on the microprocessor, may translate accessed data tables into a data structure recognized and usable by the database 401. Techniques for achieving this were discussed with reference to the method 100 depicted in FIG. 1.

According to an embodiment, the system 400 for providing an updatable result set for multiple joined tables may also include a settings table 403. The settings table 403 is implemented within a machine-accessible medium and is included within the database 401 as one of many tables and other structures housed within the database 401. The settings table 403 includes configuration information for the database translation service 402, which permits the database translation service 402 to acquire and translate database tables into the data structure in an automated fashion.

In and embodiment, the system 400 for providing an updatable result set for multiple joined tables includes a GUI tool 404. The GUI tool 404 is implemented in a machine-accessible medium and is operable to or adapted to process on a machine and interacts with an end user. The GUI tool 404 permits an end user such as an operator working through client software, to supply the settings included in the settings table 402. This user interaction and the GUI tool 404 can be illustrated by reference to the method depicted in FIG. 3.

In an embodiment, the system 400 for providing an updatable result set for multiple joined tables includes one or more post processes 405. Each post process 405 operates against the data structure and its contents by accessing operations and applications associated with the database 401. The post processes 405 reside in a machine-accessible medium and are operable or adapted to process on a machine. Some example operations that may be achieved via a post process 405 include, but are not limited to, reporting, analytics, database mining, querying, merging, joining, etc.

In an embodiment, the system 400 for providing an updatable result set for multiple joined tables includes an API 406. The API 406 includes a variety of modules or callable operations/functions. The API 406 may include SQL and its available operations and user-defined and custom operations or modules. The operations or modules may be selectively processed in the machine-accessible medium on a machine using the data structure.

The data structure produced by the database translation service 402 may be multiple joined tables residing in the database 401, a database set of multiple joined tables residing in a machine-accessible medium.

It is now appreciated how tools and techniques may be used to automate a system for providing an updatable result set with database technology. These techniques permit enterprises and individuals having database management systems to fully leverage the benefits of a system for providing an updatable result set while maintaining and operating within their existing database environments.

This Detailed Description refers to the accompanying drawings that show, by way of illustration, specific aspects and embodiments in which the present disclosure may be practiced. These embodiments are described in sufficient detail to enable those skilled in the art to practice the disclosed embodiments. Other embodiments may be used and structural, logical, and electrical changes may be made without departing from the scope of the present disclosure. The various embodiments are not necessarily mutually exclusive, as some embodiments can be combined with one or more other embodiments to form new embodiments.

The Detailed Description is, therefore, not to be taken in a limiting sense, and the scope of this disclosure is defined only by the appended claims, along with the full scope of equivalents to which such claims are entitled.

The Abstract is provided to comply with 37 C.F.R. §1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method residing in a non-transitory medium for providing an updatable result set for data fetched from multiple joined tables, the method executed on a machine and comprising:
   receiving, by the machine, a query from a client;
   accessing, by the machine, at least one database, including a first table in a first database and a subsequent table in a subsequent database;
   generating, by the machine, first metadata from a first table in the first database, and generating subsequent metadata from a subsequent table in the subsequent database, the first metadata derived from the first table and provides an indication of uniqueness of column data in the first table for the first database, the first metadata including data for column names and data types in the first table of the first database, the subsequent metadata derived from the subsequent table and provides an indication of uniqueness of column data in the subsequent table for the subsequent database, the subsequent metadata including data for column names and data types in the subsequent table of the subsequent database;
   joining, by the machine, a second table from a second database, the first table and the subsequent table together, the joining performed via an outer join operation, wherein rows from one of: the first table, the second table, or the subsequent table are padded with null values to match the respective rows of: the first table, the second table, or the subsequent table, and when a unique index from the outer join operation is null, then providing a non updatable result set;
   when the first metadata includes at least one column that indicates a unique index condition, and when the subsequent metadata includes at least one column that indicates a unique index condition, the first and the subsequent metadata indicates which particular column or particular columns in a given joined table has unique data, and when the second metadata includes at least one column that indicates a unique index condition;
   providing, by the machine, the updatable result set; and
   when the first metadata does not include at least one column that indicates a unique index condition, and when the subsequent metadata does not include at least one column that indicates a unique index condition, and when the second metadata does not include at least one column that indicates a unique index condition; then
   providing, by the machine, the non-updatable result set.

2. The method of claim 1, wherein for generating the first metadata, the unique index condition, if present, is from data derived from more than one column in the first table.

3. The method of claim 1, wherein for the subsequent generating the subsequent metadata, the unique index condition, if present, is from data derived from more than one column in the subsequent table.

4. The method of claim 1, wherein for the first generating the first metadata, the unique index condition, if present, is from data derived from more than one column in the first table; and wherein for the subsequent metadata, the unique index condition, if present, is from data derived from more than one column in the subsequent table.

5. A method residing in a non-transitory computer-readable storage medium for providing an updatable result set for data fetched from multiple joined tables, the method executed on a machine and comprising:
   receiving, by the machine, a query from a client;
   accessing, by the machine, a plurality of databases, including a first table in a first database, a second table in a second database, and a subsequent table in a subsequent database;
   generating, by the machine, first metadata from the first table, second metadata from the second table, and subsequent metadata from the subsequent table, wherein at least one of the first metadata or the subsequent metadata includes null values, the first metadata derived from the first table and provides an indication of uniqueness of column data in the first table for the first database, the first metadata including data for column names and data types in the first table of the first database, the subsequent metadata derived from the subsequent table and provides an indication of uniqueness of column data in the subsequent table for the subsequent database, the subsequent metadata including data for column names and data types in the subsequent table of the subsequent database;
   joining, by the machine, the first table, the second table, and the subsequent table together, the first, the second, and the subsequent metadata indicates which particular column or particular columns in a given joined table has unique data, the joining performed via an outer join operation, wherein rows from one of: the first table, the second table, or the subsequent table are padded with null values to match the respective rows of: the first table, the second table, or the subsequent table, and when a unique index from the outer join operation is null, then providing a non updatable result set;
   when the first metadata includes at least one column that indicates a unique index condition, and when the subsequent metadata includes at least one column that indicates a unique index condition, and when the second metadata includes at least one column that indicates a unique index condition; then
   providing, by the machine, the updatable result set; and
   when the second metadata does not include at least one column that indicates a unique index condition, or when either of the first or the subsequent metadata does not include at least one column that indicates a unique index condition, then providing the non-updatable result set.

6. The method of claim 5, wherein for the first metadata, the unique index condition is from metadata from more than one column in the first table.

7. The method of claim 5, wherein for the first metadata, the unique index condition is from metadata from more than one column in the first table, and wherein for the subsequent metadata, the unique index condition is from metadata from more than one column in the subsequent table.

8. The method of claim 5, but when the first metadata includes null values related to the unique first index, and the subsequent metadata does not include null values related to the unique second index, then
   providing the updatable result set only for columns in the subsequent metadata.

9. A system for providing an updatable result set for data fetched from multiple joined tables, the system residing in a machine-accessible medium to carry out the functions on a machine as a method when processed on the machine, comprising:
   receiving, by the machine, a query from a client software;
   accessing, by the machine, at least one database, including a first table, a second table, and a subsequent table;
   generating, by the machine, first metadata from the first table, second metadata from the second table, and generating subsequent metadata from the subsequent table, the first metadata derived from the first table and provides an indication of uniqueness of column data in the first table for the first database, the first metadata including data for column names and data types in the first table of the first database, the subsequent metadata derived from the subsequent table and provides an indication of uniqueness of column data in the subsequent table for the subsequent database, the subsequent metadata including data for column names and data types in the subsequent table of the subsequent database;
   joining, by the machine, the first table, the second table, and the subsequent table together, the first, the second, and the subsequent metadata indicates which particular column or particular columns in a given joined table has unique data, and the joining performed via an outer join operation, wherein rows from one of: the first table, the second table, or the subsequent table are padded with null values to match the respective rows of: the first table, the second table, or the subsequent table, and when a unique index from the outer join operation is null, then providing a non updatable result set;
   when the first metadata includes at least one column that indicates a unique index condition, and when the subsequent metadata includes at least one column that indicates a unique index condition, and when the second metadata includes at least one column that indicates a unique index condition; then
   providing, by the machine, the updatable result set to the client software; and
   when the first metadata does not include at least one column that indicates a unique index condition, or when either of the second metadata or the subsequent metadata does not include at least one column that indicates a unique index condition; then
   providing, by the machine, the non-updatable result set.

10. The system of claim 9, the system is accessible from a network selected from wired, wireless, or a combination of wired and wireless.

11. The system of claim 9, wherein for the first metadata, the unique index condition, if present, is from metadata from more than one column in the first table.

12. The system of claim 9, wherein for the subsequent metadata, the unique index condition, if present, is from metadata from more than one column in the subsequent table.

13. The system of claim 9, wherein for the first metadata, the unique index condition, if present, is from metadata from more than one column in the first table; and wherein for the subsequent metadata, the unique index condition, if present, is from metadata from more than one column in the subsequent table.

* * * * *